United States Patent Office 3,409,607
Patented Nov. 5, 1968

3,409,607
BENZAZEPINE DERIVATIVES
Hajime Fujimura, Kyoto, and Mikio Hori, Gifu, Japan, assignors to Takeda Chemical Industries, Ltd., Osaka, Japan
No Drawing. Filed Nov. 15, 1965, Ser. No. 507,702
Claims priority, application Japan, Nov. 16, 1964, 39/64,942
20 Claims. (Cl. 260—239)

ABSTRACT OF THE DISCLOSURE

Compounds of the formula

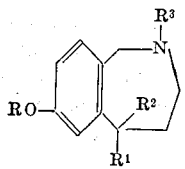

wherein R is H or alkyl with up to 4 carbon atoms, each of $R^1$ and $R^2$ is alkyl with up to 4 carbon atoms, and $R^3$ is a lower hydrocarbon residue with up to 8 carbon atoms, acyl with up to 8 carbon atoms or a halogenohydrocarbon residue with up to 8 carbon atoms, have an analgesic action characterized by absence of antagonism against N-allylnormorphine. Methods of preparation via the corresponding benzazepine derivatives of the formula

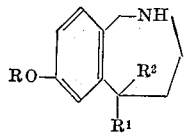

wherein R, $R^1$ and $R^2$ have the afore-recited significances, are disclosed.

Intermediates of the formula

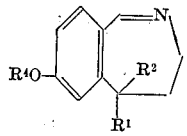

are also disclosed, $R^1$, $R^2$ and $R^4$ being $C_4$-alkyl.

---

The present invention relates to novel and useful benzazepine derivatives, and more particularly to the compounds of the formula:

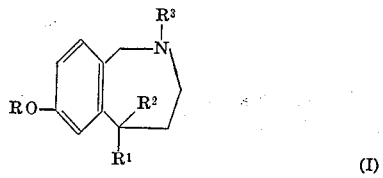

wherein R is H or alkyl with up to 4 carbon atoms, each of $R^1$ and $R^2$ is alkyl with up to 4 carbon atoms, and $R^3$ is a lower hydrocarbon residue with up to 8 carbon atoms, acyl with up to 8 carbon atoms or a halogenohydrocarbon residue with up to 8 carbon atoms.

It is known that the narcotic analgesics such as morphine, codeine, meperidine, etc. having a strong analgesic action and have been used for lightening or removing the pain engendered by various diseases or surgical operation. Employment of these narcotic analgesics, however, is bound up with various ill-effects and, therefore, their use is subject to severe legal control.

It has now been found that the compounds (I) of this invention have an analgesic action characterized by not having antagonism against nalorphine (N-allylnormorphine), whereas all hitherto known narcotic analgesics such as morphine, codeine, meperidine, etc., have such antagonism.

It is a primary object of the present invention to provide the novel and useful compounds represented by the Formula I.

Other objects will become apparent from the detailed description.

In the above-mentioned novel and useful benzazepine derivatives I, "alkyl with up to 4 carbon atoms" is exemplified by such radicals as methyl, ethyl, n-propyl, isopropyl, n-butyl, isobutyl, etc., "a lower hydrocarbon residue with up to 8 carbon atoms" is exemplified by such radicals as lower alkyl (e.g. methyl, ethyl, n-propyl, isopropyl, n-butyl or isobutyl), lower alkenyl (e.g. vinyl, allyl or dimethyl-allyl (3-methyl-2-butenyl)), lower alkynyl (e.g. ethynyl or propargyl), cyclopropylmethyl, phenyl, benzyl, phenethyl, etc., and "acyl with up to 8 carbon atoms" is exemplified by such radicals as acetyl, propionyl, butyryl, benzoyl, phenylacetyl, etc. These compounds I include for example the following:

(1) 2-phenethyl-5,5-dimethyl-7-methoxy-1,2,3,4-tetrahydro-5H-2-benzazepine;
(2) 2-phenethyl-5,5-dimethyl-7-hydroxy-1,2,3,4-tetrahydro-5H-2-benzazepine;
(3) 2-allyl-5,5-dimethyl-7-methoxy-1,2,3,4-tetrahydro-5H-2-benzazepine;
(4) 2-methyl-5,5-dimethyl-7-methoxy-1,2,3,4-tetrahydro-5H-2-benzazepine;
(5) 2,5,5-trimethyl-7-hydroxy-1,2,3,4-tetrahydro-5H-2-benzazepine;
(6) 2-allyl-5,5-dimethyl-7-hydroxy-1,2,3,4-tetrahydro-5H-2-benzazepine;
(7) 2-(3-methyl-2-butenyl)-5,5-dimethyl-7-hydroxy-1,2,3,4-tetrahydro-5H-2-benzazepine;
(8) 2-(3-methyl-2-butenyl)-5,5-dimethyl-7-methoxy-1,2,3,4-tetrahydro-5H-2-benzazepine;
(9) 2-cyclopropylmethyl-5,5-dimethyl-7-hydroxy-1,2,3,4-tetrahydro-5H-2-benzazepine;
(10) 2-cyclopropylmethyl-5-ethyl-5-methyl-7-hydroxy-1,2,3,4-tetrahydro-5H-2-benzazepine;
(11) 2-cyclopropylmethyl-5,5-dimethyl-7-methoxy-1,2,3,4-tetrahydro-5H-2-benzazepine;
(12) 2-cyclopropylmethyl-5-methyl-5-ethyl-7-methoxy-1,2,3,4-tetrahydro-5H-2-benzazepine;
(13) 2-(2-propynyl)-5,5-dimethyl-7-hydroxy-1,2,3,4-tetrahydro-5H-2-benzazepine;
(14) 2-(2-propynyl)-5,5-dimethyl-7-methoxy-1,2,3,4-tetrahydro-5H-2-benzazepine;
(15) 2,5-dimethyl-5-ethyl-7-hydroxy-1,2,3,4-tetrahydro-5H-2-benzazepine;
(16) 2,5-dimethyl-5-ethyl-7-methoxy-1,2,3,4-tetrahydro-5H-2-benzazepine;
(17) 2-methyl-5-ethyl-5-propyl-7-hydroxy-1,2,3,4-tetrahydro-5H-2-benzazepine;
(18) 2-methyl-5-ethyl-5-propyl-7-methoxy-1,2,3,4-tetrahydro-5H-2-benzazepine;
(19) 2-cyclopropylmethyl-5-ethyl-5-propyl-7-hydroxy-1,2,3,4-tetrahydro-5H-2-benzazepine;
(20) 2-cyclopropylmethyl-5-ethyl-5-propyl-7-methoxy-1,2,3,4-tetrahydro-5H-2-benzazepine;
(21) 2 - phenethyl - 5 - methyl - 5 - ethyl - 7 - hydroxy- 1,2,3,4 - tetrahydro - 5H - 2 - benzazepine;
(22) 2 - phenethyl - 5 - methyl - 5 - ethyl - 7 - methoxy- 1,2,3,4-tetrahydro-5H-2-benzazepine;
(23) 2 - phenethyl - 5 - ethyl - 5 - propyl - 7 - hydroxy- 1,2,3,4-tetrahydro-5H-2-benzazepine;
(24) 2 - phenethyl - 5 - ethyl - 5 - propyl - 7 - methoxy- 1,2,3,4-tetrahydro-5H-2-benzazepine;

(25) 2 - p - chlorophenethyl - 5,5 - dimethyl - 7 - hydroxy-1,2,3,4-tetrahydro-5H-2-benzazepine;
(26) 2 - p - chlorophenethyl - 5,5 - dimethyl-7-methoxy-1,2,3,4-tetrahydro-5H-2-benzazepine;
(27) 2 - (2 - propynyl) - 5 - methyl - 5 - ethyl - 7 - methoxy-1,2,3,4-tetrahydro-5H-2-benzazepine;
(28) 2 - allyl - 5 - methyl - 5 - ethyl - 7 - hydroxy-1,2,3,4-tetrahydro-5H-2-benzazepine;
(29) 2 - (3 - methyl - 2 - butenyl) - 5 - methyl - 5 - ethyl-7-hydroxy-1,2,3,4-tetrahydro-5H-2-benzazepine;
(30) 2 - cis - 3 - chloroallyl - 5,5 - dimethyl - 7 - hydroxy-1,2,3,4-tetrahydro-5H-2-benzazepine;
(31) 2 - cis - 3 - chloroallyl - 5,5 - dimethyl - 7 - methoxy-1,2,3,4-tetrahydro-5H-2-benzazepine;
(32) 2 - phenylacetyl - 5,5 - dimethyl - 7 - methoxy-1,2,3,4-tetrahydro-5H-2-benzazepine;
(33) 2 - phenylacetyl - 5,5 - dimethyl - 7 - hydroxy-1,2,3,4-tetrahydro-5H-2-benzazepine;
(34) 2 - phenylacetyl - 5 - methyl - 5 - ethyl-7-methoxy-1,2,3,4-tetrahydro-5H-2-benzazepine;
(35) 2 - phenylacetyl - 5 - methyl - 5 - ethyl-7-hydroxy-1,2,3,4-tetrahydro-5H-2-benzazepine;
(36) 2 - phenylacetyl - 5 - methyl - 5 - propyl-7-methoxy-1,2,3,4-tetrahydro-5H-2-benzazepine;
(37) 2 - phenylacetyl - 5 - methyl - 5 - propyl - 7 - hydroxy-1,2,3,4-tetrahydro-5H-2-benzazepine;
(38) 2 - p - chlorophenylacetyl - 5,5 - dimethyl - 7 - methoxy-1,2,3,4-tetrahydro-5H-2-benzazepine;
(39) 2 - p - chlorophenylacetyl - 5,5 - dimethyl - 7 - hydroxy-1,2,3,4-tetrahydro-5H-2-benzazepine;
(40) 2 - cyclopropylcarbonyl - 5,5 - dimethyl-7-methoxy-1,2,3,4-tetrahydro-5H-2-benzazepine;
(41) 2 - cyclopropylcarbonyl - 5,5 - dimethyl - 7 - hydroxy-1,2,3,4-tetrahydro-5H-2-benzazepine.

The compounds (I) are prepared by allowing the benzazepine derivatives represented by the formula

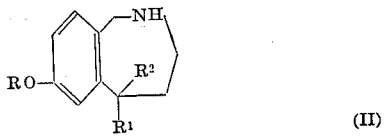

(II)

wherein each of R, $R^1$ and $R^2$ is the same as above, to react with alkylating agent of the formula $$R^{3-1}\text{—}X^1 \qquad (III)\text{-}1$$

wherein $R^{3-1}$ is a lower hydrocarbon residue with up to 8 carbon atoms or a halogenohydrocarbon residue with up to 8 carbon atoms and $X^1$ is halogen, half a sulfate radical, sulfinyl radical or a sulfonyloxy group, or to react with acylating agent of the formula $$R^{3-2}\text{—}X^2 \qquad (III)\text{-}2$$

wherein $R^{3-2}$ is acyl with up to 8 carbon atoms and $X^2$ is halogen, half a sulfate radical or a sulfinyl radical, a sulfonyloxy group or a radical —$OR^6$ wherein $R^6$ is hydrogen, lower alkyl or lower acyloxy with up to 8 carbon atoms.

The reaction is generally carried out under heating, though it may be carried out, if desired, at ambient temperature or under cooling, and usually in a solvent such as water, methanol, ethanol, isopropyl, alcohol, butanol, tetrahydrofuran, dioxane, ether, petroleum ether, dichloromethane, chloroform, benzene, toluene, xylene, dimethylformamide, pyridine, aldehyde collidine, etc., or a mixture thereof.

The reaction is accelerated by the presence in the reaction medium of a base such as sodium hydroxide, potassium hydroxide, calcium hydroxide, dimethylformamide, pyridine, etc. when there is used the alkylating or acylating agent containing as $X^1$ or $X^2$ halogen, half a sulfate radical or a sulfinyl radical, or a sulfonyloxy group. And, in the reaction of the acylating agent containing hydroxy radical as $X^2$, the reaction is generally carried out in the presence in the reaction medium of a dehydrating agent such as phosphoric anhydride, polyphosphoric acid, phosphorus pentoxide, concentrated sulfuric acid, anhydrous zinc chloride, substituted-carbodiimide (e.g. dimethyl-carbodiimide, etc.), etc. The reaction of the acylating agent with benzazepine derivative (II) can be followed by hydrogenation using such reducing agents as hydrogen gas, hydrogen halide and metal hydrogen sulfide, alkali metal boron hydrides (e.g. lithium boron hydride, sodium boron hydride and potassium boron hydride), alkali metal aluminum hydride, aluminum isopropoxide, alkali metal (e.g., lithium, sodium and potassium), magnesium, calcium, aluminum, zinc, hydrogen and catalyst (e.g. platinum, palladium, nickel, cobalt, iron and Raney nickel), etc.

The starting material (II) used in the above process is prepared, for example, by the following sequence of reactions, where R, $R^1$, $R^2$, $R^3$, and $R^4$ are the same as mentioned above, $R^5$ is lower alkyl and Y is halogen:

(1) Allowing a compound of the formula

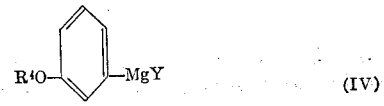

(IV)

to react with a compound of the formula

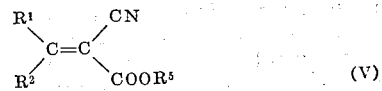

(V)

or allowing a compound of the formula $$R_1\text{—}MgY \qquad (VI)$$

to react with a compound of the formula

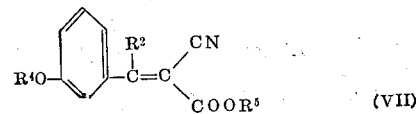

(VII)

to give a compound of the formula

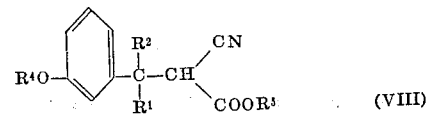

(VIII)

(2) Hydrolyzing and decarboxylating compound (VIII) to give a compound of the formula

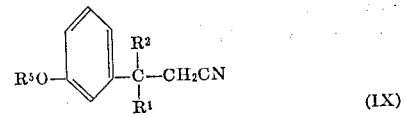

(IX)

(3) Hydrogenating compound (IX) to give a compound of the formula

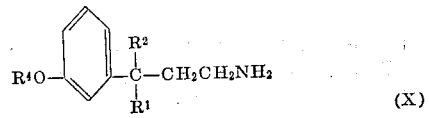

(X)

(4) Introducing a formyl group into the amino group of compound (X) to afford a compound of the formula

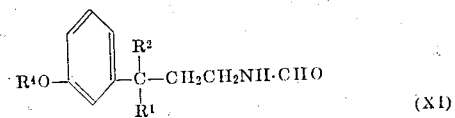

(XI)

(5) Condensing intramolecularly compound (XI) by the use of a dehydrating agent to give a compound of the formula

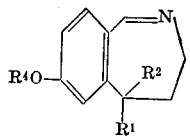

(XII)

The intramolecular condensation of compound (XI) is generally carried out under heating in the presence of dehydrating agent such as phosphoric anhydride, polyphosphoric acid, polyphosphoric ester, phosphorus pentoxide, concentrated sulfuric acid, anhydrous zinc chloride, etc. in a solvent such as methanol, ethanol, isopropanol, butanol, tetrahydrofuran, dioxane, ether, petroleum ether, chloroform, benzene, toleune, xylene, dimethylformamide, pyridine, aldehyde collidine, etc., or a mixture thereof.

(6) Hydrogenating compound (XII) to give the compound of the formula (II). Reducing agent applicable to this reaction are, for example, hydrogen gas, metal and hydrogen halide (e.g. hydrogen bromide, hydrogen fluoride), hydrogen sulfide, alkali metal boron hydrides (e.g. lithium boron hydride, sodium boron hydride and potassium boron hydride), alkali metal aluminum hydrides (e.g. lithium aluminum hydride, sodium aluminum hydride, and potassium aluminum hydride), diethyl aluminum hydride, aluminum isopropoxide, alkali metal (e.g. lithium, sodium and potassium), magnesium, calcium, aluminum, zinc, hydrogen and catalyst (e.g. platinum, palladium, nickel, cobalt, iron, Raney catalyst), etc.

If desired, the compound represented by the formula

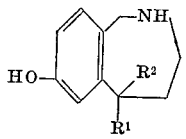

(XIII)

wherein $R^1$ and $R^2$ are the same as the above, can be prepared by hydrolysis of the compound (XII) in the presence of concentrated hydrobromic acid, hydrofluoric acid or a Grignard reagent and by heating at a temperature higher than 100° C. under atmospheric or elevated pressure.

Further, if desired, the compound represented by the formula

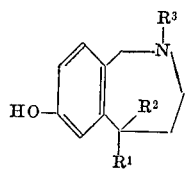

(XIV)

wherein $R^1$, $R^2$ and $R^3$ are the same as the above, can be prepared by hydrolysis of the compound represented by the formula

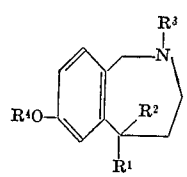

(XV)

wherein $R^1$, $R^2$, $R^3$ and $R^4$ are the same as the above, in the presence of acid catalyst.

The benzazepine derivatives (I) are employed as analgesics and are generally administered by injection. The injectable composition containing one or more of the benzazepine derivatives (I) is prepared according to any per se conventional means for the preparation of injections.

As for the analgesic, an effective single dose of the benzazepine derivative (I) is usually about 0.02 to 2 milligrams per kilogram of body weight and desirably about 0.4 to 1 milligrams per kilogram of body weight. An effective single dose may be administered several times a day depending on cases.

It is to be understood that the following examples are solely for the purpose of illustration and are not to be construed as limitations of this invention. In these examples, "g." and "ml." are "gram" and "milliliter," respectively. Temperatures are all uncorrected, and percentages are all on the weight basis.

EXAMPLE 1

(1) 5,5-dimethyl-7-methoxy-3,4-dihydro-5H-2-benzazepine

A mixture of 29 g. of N-formyl-3-methyl-3-(m-methoxyphenyl)-butylamine, 290 g. of phosphorus pentoxide ($P_2O_5$) and 290 ml. of absolute benzene is refluxed for 16 hours with exclusion of moisture on a water-bath. After cooling, the resulting mixture is rendered alkaline by the addition of an aqueous solution of sodium hydroxide under cooling with ice, and is then subjected to extraction with benzene. The benzene-phase is further subjected to extraction with 1-normal sulfuric acid. The sulfuric acid extract is rendered alkaline by the addition of an aqueous solution of sodium hydroxide. The resulting solution is subjected to extraction with ether, and then washed with water, followed by drying with potassium carbonate. Removal of the solvent by evaporation gives 13 g. of 5,5-dimethyl-7-methoxy-3,4-dihydro-5H-2-benzazepine as colorless oily substance boiling at 139° C./3 mm. Hg. The hydrochloride of the compound is constituted by colorless needles melting at 193° C. (recrystallized from a mixture of ethyl acetate and methanol).

*Elementary analysis.*—Calculated for $C_{13}H_{18}ONCl$: C, 65.13; H, 7.58. Found: C, 65.14; H, 7.56.

The picrate of the compound is in the form of yellow granules melting at 196° C. (recrystallized from ethanol).

*Elementary analysis.*—Calculated for $$C_{13}H_{17}ON.C_6H_3O_7N_3$$

C, 52.77; H, 4.56; N, 12.96. Found: C, 52.74; H, 4.79; N, 12.90.

(2) 5,5-dimethyl-7-methoxy-1,2,3,4-tetrahydro-5H-2-benzazepine

To a mixture of 48 ml. of concentrated hydrochloric acid and 60 ml. of ethanol are added 2.5 g. of 5,5-dimethyl-7-methoxy-3,4-dihydro-5H-2-benzazepine hydrochloride and 4.8 g. of tin powder. The resultant mixture is refluxed for 3 hours on a water-bath. After distilling off the ethanol, the residue is rendered alkaline by the addition of 10% aqueous solution of sodium hydroxide, and is then subjected to extraction with ether. After being washed with water, the extract is dried with potassium carbonate, followed by distillation of the solvent to give 2.3 g. of 5,5-dimethyl-7-methoxy-1,2,3,4-tetrahydro-5H-2-benzazepine as colorless oily substance. The picrate of the compound is constituted by yellow plates melting at 200.5° C. (recrystallized from ethanol).

*Elementary analysis.*—Calculated for $$C_{13}H_{19}ON.C_6H_3O_7N_3$$

C, 52.10; H, 5.10. Found: C, 52.23; H, 5.49.

(3) 2-phenethyl-5,5-dimethyl-7-methoxy-1,2,3,4-tetrahydro-5H-2-benzazepine

To a mixture of 3.5 g. of 5,5-dimethyl-7-methoxy-1,2,3,4-tetrahydro-5H-2-benzazepine, 7.5 g. of potassium carbonate, 25 ml. of water and 75 ml. of methanol is added 5 ml. of phenylacetyl chloride with stirring. After one hour, three times the volume is added to the reaction mixture, followed by extraction with ether. The extract is washed with dilute hydrochloric acid, with dilute sodium hydroxide solution and with water in that order, and then dried with potassium carbonate. After distilling off the solvent, the residue is dissolved in 20 ml. of ether and the solution is dropped into an ethereal solution containing 2.0 g. of lithium aluminum hydride. The resulting solution is refluxed for 8 hours and, after cooling, the excess of lithium aluminum hydride is decomposed with ice water containing ammonium chloride. The ether phase is separated, washed with dilute sodium hydroxide solution and then with water, and dried with potassium carbonate. Hydrogen bromide gas is introduced into the ether solution to obtain 3.0 g. of 2-phenethyl-5,5-dimethyl-7 - methoxy-1,2,3,4-tetrahydro-5H-2-benzazepine hydrobromide, as colorless needles (recrystallized from acetone) melting at 186° C.

Elementary analysis.—Calculated for $C_{21}H_{28}ONBr$: C, 64.67; H, 7.24; N, 3.59. Found: C, 64.70; H, 7.12; N, 3.40.

EXAMPLE 2

2-phenethyl-5,5-dimethyl-7-hydroxy-1,2,3,4-tetrahydro-5H-2-benzazepine 20 g. of 2-phenethyl-5,5-dimethyl-7-methoxy-1,2,3,4-tetrahydro-5H-2-benzazepine hydrobromide is added to 14 ml. of 48% hydrobromic acid, and the mixture is refluxed for 30 minutes. The reaction mixture is concentrated to dryness under reduced pressure. The residue is crystallized from a mixture of methanol and ethanol to obtain 1.5 g. of 2-phenethyl-5,5-dimethyl-7-hydroxy-1,2, 3,4-tetrahydro-5H-benzazepine hydrobromide as colorless prisms melting at 246° C.

Elementary analysis.—Calculated for $C_{20}H_{26}ONBr$: C, 63.87; H, 6.97; N, 3.73. Found: C, 63.72; H, 6.83; N, 3.89.

EXAMPLE 3

(1) 5-methyl-5-ethyl-7-methoxy-3,4-dihydro-5H-2-benzazepine

A mixture of 15 g. of N - formyl - 3 - methyl - 3 (m-methoxyphenyl)-pentylamine, 150 g. of phosphorus pentoxide ($P_2O_5$) and 150 ml. of absolute benzene is refluxed for 16 hours on a water-bath with exclusion of moisture. The reaction mixture is cooled by the addition of ice and then, in the presence of ice, rendered alkaline by the addition of an aqueous solution of sodium hydroxide. The alkaline solution is subjected to extraction with benzene and the solvent is distilled off. The residue is purified by repeating the extraction of the basic substance by the use of benzene and normal sulfuric acid. The sulfuric acid-phase is rendered alkaline by the addition of an aqueous solution of sodium hydroxide, and is then subjected to extraction with ether. After being washed with water, the ether-phase is dried with potassium carbonate, and the solvent is distilled off to obtain 65 g. of 5-methyl-5-ethyl-7-methoxy - 3,4 - dihydro-5H-2-benazepine as an oily substance. The picrate of the compound is in the form of colorless needles melting at 154° C. (recrystallized from ethanol).

Elementary analysis.—Calculated for $$C_{14}H_{19}ON \cdot C_6H_3O_7N_3$$

C, 53.86; H, 4.97; N, 12.56. Found: C, 53.70; H, 4.82; N, 12.18.

(2) 2-phenethyl-5-methyl-5-ethyl-7-methoxy-1,2,3,4-tetrahydro-5H-2-benzazepine

In the same manner as in Example 1 (2) and (3) respectively, 5-methyl-5-ethyl-7-methoxy-3,4-dihydro - 5H-2-benzazepine is hydrogenated and the resultant product is reacted with phenylacetylchloride to obtain 2-phenethyl-5 - methyl-5-ethyl-7-methoxy - 1,2,3,4 - tetrahydro-5H-2-benzazepine hydrobromide as white needles melting at 208° C. (recrystallized from acetone).

EXAMPLE 4

2-phenethyl-5-methyl-5-propyl-3-methoxy-1,2,3,4-tetrahydro-5H-5-benzazepine

A mixture of 13.5 g. of N-formyl-3-methyl-3-(m-methoxyphenyl)-hexylamine, 135 g. of phosphorus pentoxide ($P_2O_5$) and 135 ml. of benzene is refluxed for 30 hours and treated in the same manner as in Example 3 (1) to obtain 4.5 g. of 5-methyl-5-propyl-7-methoxy-3,4-dihydro-5H-2-benzazepine. The picrate of this compound is constituted by yellow prisms melting at 129° C. (recrystallized from ethanol).

Elementary analysis.—Calculated for $$C_{15}H_{21}ON \cdot C_6H_3O_7N_3$$

C, 54.78; H, 5.26; N, 12.17. Found: C, 54.55; H, 5.20; N, 12.32.

This compound in the free form is treated in the same manner as in Example 3 (2) to obtain 2-phenethyl-5-methyl-5-propyl-7-methoxy - 1,2,3,4 - tetrahydro - 5H-2-benzazepine as an oily substance.

EXAMPLE 5

2-phenethyl-5-methyl-5-ethyl-7-hydroxy-1,2,3,4-tetrahydro-5H-2-benzazepine

A mixture of 2.0 g. of 2-phenethyl-5-methyl-5-ethyl-7-methoxy-1,2,3,4-tetrahydro-5H-2-benzazepine and 40 ml. of 48% hydrobromic acid is refluxed for 2 hours at 160° C. After being cooled, the precipitated crystals are filtered and washed with ether, and then recrystallized from methanol to obtain 1.6 g. of 2-phenethyl-5-methyl-5-ethyl-7-hydroxy-1,2,3,4-tetrahydro - 5H-2 - benzazepine hydrobromide as white needles melting at 269° C.

Elementary analysis.—Calculated for $C_{21}H_{28}ONBr$: C, 64.73; H, 7.26; N, 3.60. Found: C, 64.82; H, 7.50; N, 3.55.

EXAMPLE 6

2-phenethyl-5-methyl-5-propyl-7-hydroxy-1,2,3,4-tetrahydro-5H-2-benzazepine 2.1 g. of 2-phenethyl-5-methyl-5-propyl-7-methoxy-1, 2,3,4-tetrahydro-5H-2-benzazepine is treated in the same manner as in Example 5 to obtain 1.5 g. of 2-phenethyl-5-methyl-5-propyl-7-hydroxy - 1,2,3,4 - tetrahydro-5H-2-benzazepine as white prisms melting at 239° C.

Elementary analysis.—Calculated for $C_{22}H_{30}ONBr$: C, 65.45; H, 7.50; N, 3.48. Found: C, 65.41; H, 7.81; N, 3.40.

EXAMPLE 7

2-p-chloro-phenethyl-5,5-dimethyl-7-methoxy-1,2,3,4-tetrahydro-5H-2-benzazepine

This compound is prepared from 5,5-dimethyl-7-methoxy-1,2,3,4-tetrahydro-5H-2-benzazepine and p-chloro-phenethyl bromide in the same manner as in Example 1 (3). The hydrobromide is colorless prisms melting at 221° C.

Elementary analysis.—Calculated for $C_{21}H_{26}ONCl \cdot HBr$: C, 59.34; H, 6.40; N, 3.30. Found: C, 59.21; H, 6.91; N, 3.40.

EXAMPLE 8

(1) 5,5-dimethyl-7-methoxy-1,2,3,4-tetrahydro-5H-2-benzazepine hydrobromide

Dry hydrogen bromide gas is introduced into an ether solution of 1.0 g. of 5,5-dimethyl-7-methoxy-1,2,3,4-tetrahydro-5H-2-benzazepine to obtain white precipitates. The precipitates are washed with ether, then crystallized from acetone-methanol to obtain the objective compound as white needles melting at 154° C.

Elementary analysis.—Calculated for $C_{13}H_{19}ON \cdot HBr$: C, 54.59; H, 7.05; N, 4.90. Found: C, 54.60; H, 7.12; N, 4.81.

(2) 5,5-dimethyl-7-hydroxy-1,2,3,4-tetrahydro-5H-2-benzazepine hydrobromide

A mixture of 1.2 g. of the compound prepared under (1) and 50 ml. of 48% hydrobromic acid is refluxed for 3 hours at 160° C. and the resultant solution is concentrated to dryness under reduced pressure. The residue is recrystallized twice from a mixture of methanol and acetone to obtain 1.18 g. of the objective compound as white needles melting at 259° C.

Elementary analysis.—Calculated for $C_{12}H_{17}ON\cdot HBr$: C, 52.95; H, 6.67; N, 5.15. Found: C, 52.94; H, 6.57; H, 5.00.

(3) 2-(3,3-dimethylallyl)-5,5-dimethyl-7-hydroxy-1,2,3,4-tetrahydro-5H-2-benzazepine A mixture of 5,5-dimethyl-7-hydroxy-1,2,3,4-tetrahydro-5H-2-benzazepine hydrobromide, 1-bromo-3-methyl-2-butene and sodium bicarbonate (molar ratio 1:1:30) in dimethylformamide is refluxed for 5 hours and then subjected to filtration. The filtrate is washed with ethanol and the solvent is removed in vacuo. Ether is added to the residue and undissolved substance is filtered off. The ether-phase is subjected to extraction with 10% hydrochloric acid. The extract is rendered alkaline by the addition of a dilute aqueous solution of ammonia and subjected to extraction with ether, followed by drying with potassium carbonate. Removal of the solvent by evaporation gives 2-(3,3-dimethylallyl)-5,5-dimethyl-7-hydroxy-1,2,3,4-tetrahydro-5H-2-benzazepine as an oily substance. The hydrochloride of the compound is crystallized from a mixture of benzene and methanol to form lemon-yellow glassy crystals melting at 102–103° C.

EXAMPLE 9

2-cyclopropylmethyl-5,5-dimethyl-7-hydroxy-1,2,3,4-tetrahydro-5H-2-benzazepine

To a solution of one mole of 5,5-dimethyl-7-hydroxy-1,2,3,4-tetrahydro-5H-2-benzazepine hydrobromide in hot methanol, 3.1 moles of $K_2CO_3$—$H_2O$ (molar ratio 2:3) is added and, after the mixture is cooled, 2.1 moles of cyclopropylcarbonyl chloride is further added thereto under stirring. The whole mixture is stirred for further 3 hours at room temperature, then the solvent is removed in vacuo. The residue is dissolved in tetrahydrofuran, followed by drying with potassium carbonate. The solution is added to a solution, warmed to 35° C., of excess lithium aluminium hydride in tetrahydrofuran, and the resultant solution is refluxed for 4 hours. After cooling, excess of lithium aluminum hydride is decomposed with ethyl acetate and the solution is added to the saturated aqueous solution of ammonium sulfate to separate tetrahydrofuran. The aqueous-phase is subjected to extraction with dichloromethane twice and the combined extract is dried with magnesium sulfate. Removal of the solvent by evaporation gives 2-cyclopropylmethyl-5,5-dimethyl-7-hydroxy-1,2,3,4-tetrahydro-5H-2-benzazepine as an oily substance. The hydrochloride of the compound is crystallized from a mixture of benzene and methanol to form white glassy crystals melting at 104–106° C.

EXAMPLE 10

In the method of Example 9, trimethylamine is employed as the condensing agent to obtain the same product.

EXAMPLE 11

2-(2-propynyl)-5,5-dimethyl-7-hydroxy-1,2,3,4-tetrahydro-5H-2-benzazepine

This compound is prepared from 5,5-dimethyl-7-hydroxy-1,2,3,4-tetrahydro-5H-2-benzazepine hydrobromide, 2-propynyl bromide and sodium bircarbonate in the same manner as in Example 8 (3), as an oily substance. The hydrochloride of the compound is crystallized from a mixture of benzene and methanol to form lemon-yellow glassy crystals melting at 106–107° C.

EXAMPLE 12

2-(3,3-dimethylallyl)-5,5-dimethyl-7-methoxy-1,2,3,4-tetrahydro-5H-2-benzazepine This compound is prepared from 5,5-dimethyl-7-methoxy-1,2,3,4-tetrahydro-5H-2-benzazepine and 1-bromo-3-methyl-2-butene in the same manner as in Example 8 (3), as a colorless oily substance boiling at 130–132° C./3 mm. Hg.

EXAMPLE 13

2-(2-propynyl)-5,5-dimethyl-7-methoxy-1,2,3,4-tetrahydro-5H-2-benzazepine

This compound is prepared from 5,5-dimethyl-7-methoxy-1,2,3,4-tetrahydro - 5H - 2-benzazepine and 2-propynyl bromide in the same manner as in Example 8 (3), as a colorless oily substance boiling at 141° C./3 mm. Hg.

EXAMPLE 14

2,5,5-trimethyl-7-methoxy-1,2,3,4-tetrahydro-5H-2-benzazepine

This compound is prepared from 5,5-dimethyl-7-methoxy - 1,2,3,4 - tetrahydro-5H-2-benzazepine and methyl iodide in the same manner as in Example 8 (3), as a colorless oily substance boiling at 143° C./5 mm. Hg.

Elementary analysis.—Calculated for $C_{14}H_{21}ON$: C, 76.66; H, 9.66; N, 6.39. Found: C, 76.32; H, 9.97; N, 6.21.

EXAMPLE 15

2-allyl-5,5-dimethyl-7-methoxy-1,2,3,4-tetrahydro-5H-2-benzazepine

This compound is prepared from 5,5-dimethyl-7-methoxy - 1,2,3,4 - tetrahydro-5H-2-benzazepine and allyl bromide in the same manner as in Example 8 (3), as a colorless oily substance boiling at 147° C./3 mm. Hg.

Elementary analysis.—Calculated for $C_{16}H_{23}ON$: C, 78.43; H, 9.46; N, 5.72. Found: C, 78.53; H, 9.62; N, 5.63.

EXAMPLE 16

2-phenethyl-5,5-dimethyl-7-hydroxy-1,2,3,4-tetrahydro-5H-2-benzazepine hydrobromide This compound is prepared from 5,5-dimethyl-7-hydroxy-1,2,3,4-tetrahydro-5H-2-benzazepine and phenethylchloride in the same manner as in Example 8 (3), as colorless prisms which melt at 246° C.

EXAMPLE 17

2-p-chlorophenethyl-5,5-dimethyl-7-hydroxy-1,2,3,4-tetrahydro-5H-2-benzazepine hydrobromide This compound is prepared from 5,5-dimethyl-7-hydroxy-1,2,3,4-tetrahydro-5H-2-benzazepine and p-chlorophenethylbromide in the same manner as in Example 8 (3), as colorless needles which melt at 210–211° C.

EXAMPLE 18

(1) 2,5,5-trimethyl-7-methoxy-1,2,3,4-tetrahydro-5H-2-benzazepine

A mixture of 2.0 g. of 5,5-dimethyl-7-methoxy-1,2,3,4-tetrahydro-5H-2-benzazepine, 20 g. of 80% formic acid and 8 g. of formalin is refluxed for 8 hours on an oil-bath at 90–100° C. After cooling, the resultant solution is acidified by the addition of dilute hydrochloric acid and then subjected to distillation under reduced pressure. To the residue are added water and ether, and the mixture is stirred. The aqueous-phase is rendered alkaline and then subjected to extraction with ether. After being washed with water, the ether-phase is dried with potassium carbonate. Removal of the solvent by evaporation gives 1.7 g. of the objective compound as colorless oily substance boiling at 145° C./5 mm. Hg.

(2) 2,5,5-trimethyl-7-hydroxy-1,2,3,4-tetrahydro-5H-2-benzazepine 1 g. of 2,5,5-trimethyl-7-methoxy-1,2,3,4-tetrahydro-5H-2-benzazepine is allowed to react with 20 ml. of 48% hydrobromic acid for 2 hours at 160° C. The reaction mixture is concentrated to dryness under reduced pressure to obtain 1.2 g. of hydrobromide of the objective compound as oily substance.

(3) 5,5-dimethyl-7-hydroxy-1,2,3,4-tetrahydro-5H-2-benzazepine

A solution of 1.7 g. of 2,5,5 - trimethyl - 7 - hydroxy-1,2,3,4-tetrahydro-5H-2-benzazepine in 8 ml. of chloroform is added during 45 minutes to a solution of 1 g. of cyanogen bromide in 10 ml. of chloroform under stirring. The solution is refluxed for 2 hours and evaporated to dryness in vacuo. The residue and 36 ml. of 6% hydrochloric acid is refluxed for 20 hours. After cooling the reaction mixture, ammonium hydroxide is added thereto, whereby the objective compound is liberated as an oily substance. The hydrobromide of this compound is in the form of white needles melting at 250° C.

EXAMPLE 19

2-cis-3-chloroallyl-5,5-dimethyl-7-methoxy-5,5-dimethyl-1,2,3,4-5H-2-benzazepine This compound is prepared from 5,5-dimethyl-7-methoxy-1,2,3,4-tetrahydro-5H-2-benzazepine and 3-chloroallylbromide in the same manner as in Example 8 (3), as colorless oily substance which boils at 145° C./33 mm. Hg.

What we claim is:

1. A compound of the formula

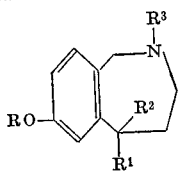

wherein R is H or alkyl with up to 4 carbon atoms, each of $R^1$ and $R^2$ is alkyl with up to 4 carbon atoms, and $R^3$ is a lower hydrocarbon group with up to 8 carbon atoms, a hydrocarbon carboxylic acyl radical with up to 8 carbon atoms or a halogeno-hydrocarbon group with up to 8 carbon atoms.

2. The compound as claimed in claim 1, wherein $R^3$ is alkyl with up to 4 carbon atoms, alkenyl with up to 4 carbon atoms, alkynyl with up to 4 carbon atoms, hydrocarbon carboxylic acyl with up to 8 carbon atoms, cyclopropylmethyl, phenethyl, chlorophenethyl or chloroallyl.

3. A compound according to claim 1, said compound being the 2 - phenethyl - 5,5 - dimethyl-7-methoxy-1,2,3,4-tetrahydro-5H-2-benzazepine.

4. A compound according to claim 1, said compound being the 2 - phenethyl - 5,5 - dimethyl-7-hydroxy-1,2,3,4-tetrahydro-5H-2-benzazepine.

5. A compound according to claim 1, said compound being the 2-phenethyl-5-methyl-5-ethyl-7-hydroxy-1,2,3,4-tetrahydro-5H-2-benzazepine.

6. A compound according to claim 1, said compound being the 2-phenethyl-5-methyl-5-propyl-7-hydroxy-1,2,3,4-tetrahydro-5H-2-benzazepine.

7. A compound according to claim 1, said compound being the 2-methyl-5,5-dimethyl-7-hydroxy-1,2,3,4-tetrahydro-5H-2-benzazepine.

8. A compound according to claim 1, said compound being the 2-(3-methyl-2-butenyl)-5,5-dimethyl-7-hydroxy-1,2,3,4-tetrahydro-5H-2-benzazepine.

9. A compound according to claim 1, said compound being the 2-(2-propynyl)-5,5-dimethyl-7-hydroxy-1,2,3,4-tetrahydro-5H-2-benzazepine.

10. A compound according to claim 1, said compound being the 2-cyclopropylmethyl-5,5-dimethyl-7-hydroxy-1,2,3,4-tetrahydro-5H-2-benzazepine.

11. A compound according to claim 1, said compound being the 2-allyl-5,5-dimethyl-7-hydroxy-1,2,3,4-tetrahydro-5H-2-benzazepine.

12. A compound according to claim 1, said compound being the 2-allyl-5,5-dimethyl-7-methoxy-1,2,3,4-tetrahydro-5H-2-benzazepine.

13. A compound according to claim 1, said compound being the 2-p-chlorophenethyl-5,5-dimethyl-7-hydroxy-1,2,3,4-tetrahydro-5H-2-benzazepine.

14. A compound according to claim 1, said compound being the 2-phenylacetyl-5,5-dimethyl-7-methoxy-1,2,3,4-tetrahydro-5H-2-benzazepine.

15. A compound according to claim 1, said compound being the 2-cyclopropylcarbonyl-5,5-dimethyl-7-hydroxy-1,2,3,4-tetrahydro-5H-2-benzazepine.

16. A compound according to claim 1, said compound being the 2-cis-3-chloroallyl-5,5-dimethyl-7-methoxy-1,2,3,4-tetrahydro-5H-2-benzazepine.

17. A compound of the formula

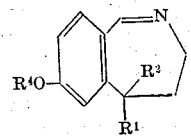

wherein each of $R^1$, $R^3$ and $R^4$ is alkyl with up to 4 carbon atoms.

18. A compound according to claim 17, said compound being the 5,5-dimethyl-7-methoxy - 3,4 - dihydro - 5H - 2-benzazepine.

19. A compound according to claim 17, said compound being the 5-methyl-5-ethyl-7-methoxy-3,4-dihydro-5H-2-benzazapine.

20. A compound according to claim 17, said compound being the 5-methyl-5-propyl-7-methoxy-3,4-dihydro-5H-2-benzazepine.

References Cited
UNITED STATES PATENTS 3,093,632  6/1963  Mull _____ 260—239

ALTON D. ROLLINS, *Primary Examiner.*